United States Patent [19]

Correa

[11] Patent Number: 4,863,242

[45] Date of Patent: Sep. 5, 1989

[54] UNIVERSAL PERSONAL COMPUTER VISOR/ORGANIZER ASSEMBLY

[76] Inventor: Carlos G. Correa, 5701-A NW. 74th Ave., Miami, Fla. 33166

[21] Appl. No.: 216,961

[22] Filed: Jul. 11, 1988

[51] Int. Cl.⁴ .............................................. G02B 27/00
[52] U.S. Cl. ................................. 350/276 R; 358/255
[58] Field of Search .................... 350/276 R; 358/255, 358/252

[56] References Cited

U.S. PATENT DOCUMENTS 4,444,465 4/1984 Giulie et al. .................... 350/276 R

FOREIGN PATENT DOCUMENTS 0563971 6/1957 Italy ..................................... 358/255

Primary Examiner—Bruce Y. Arnold
Assistant Examiner—Rebecca D. Gass
Attorney, Agent, or Firm—Malloy & Malloy

[57] ABSTRACT

A visor assembly structured to effectively shade a viewing screen of a monitor of the type utilized in a personal computer or like equipment to the extent of at least partially shading light from a viewing screen of the equipment thereby preventing unwanted glare appearing thereon. The visor assembly is adjustably mounted along an upper periphery of a housing of the viewing screen and adjustable longitudinally to accommodate monitors or screen housings of various sizes and outwardly in angularly overlying relation to the viewing screen for optimum positioning to prevent glare thereon.

16 Claims, 4 Drawing Sheets

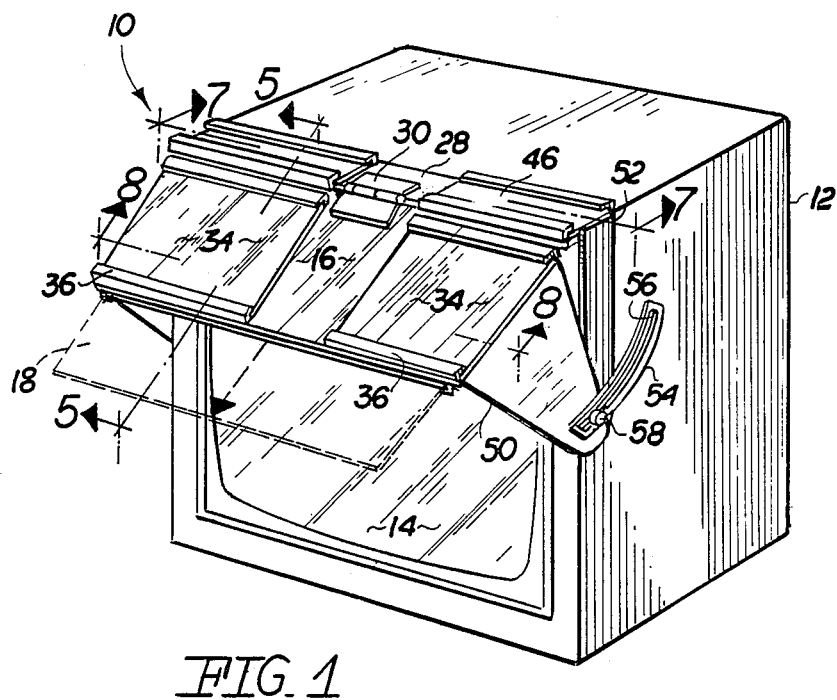
FIG. 1
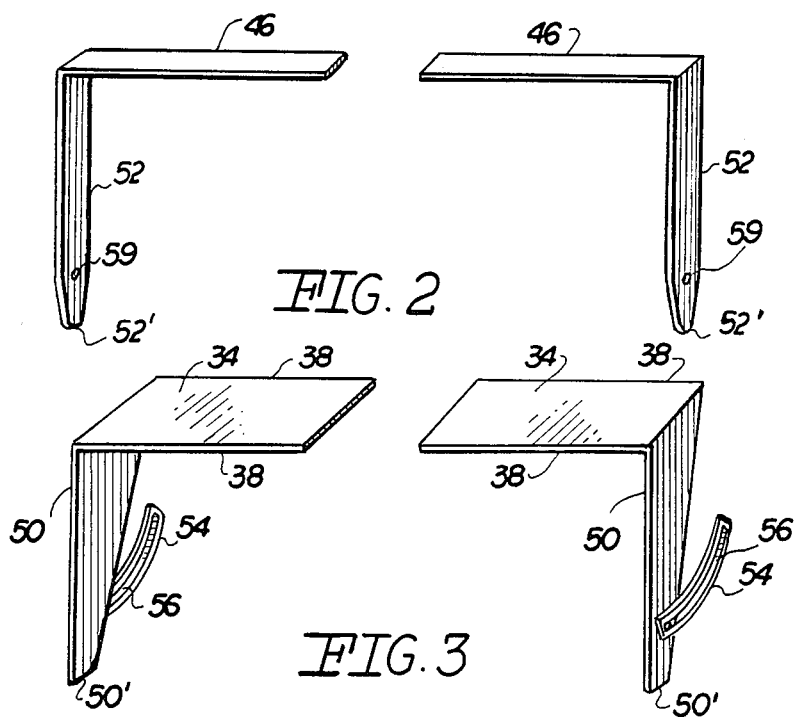
FIG. 2
FIG. 3

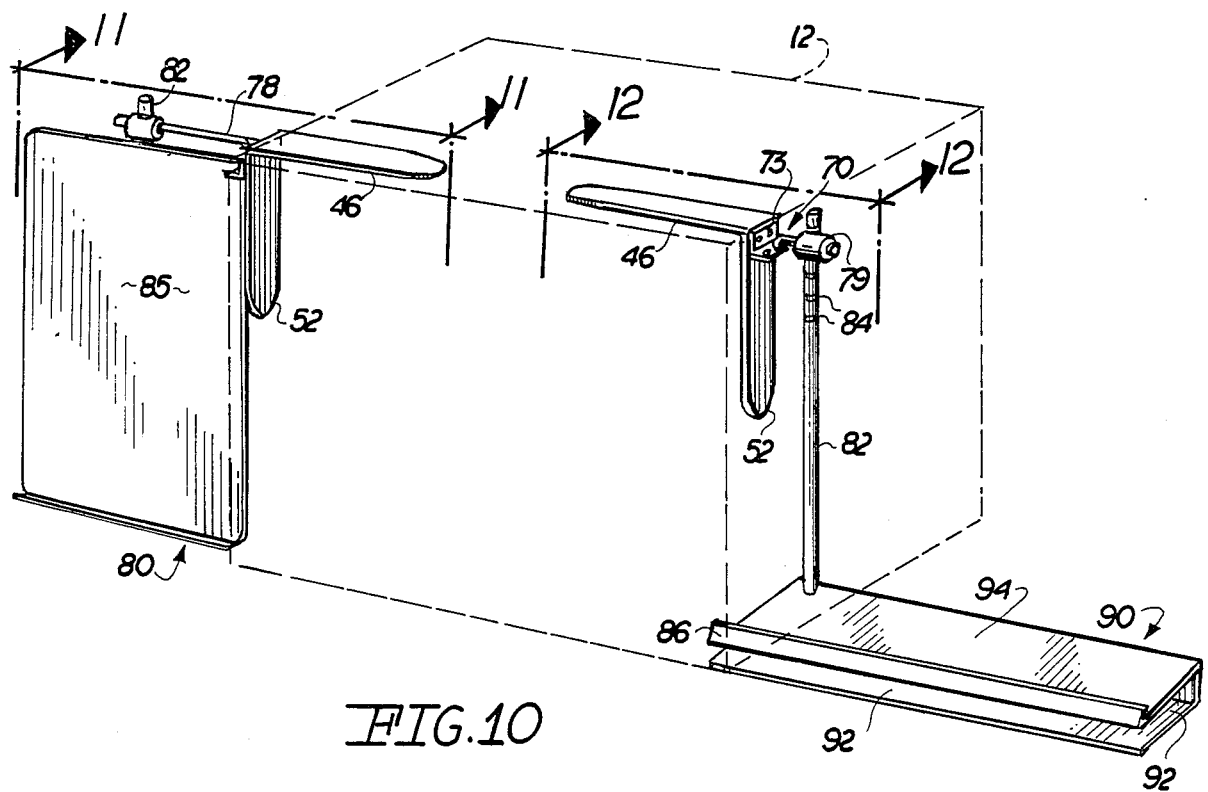
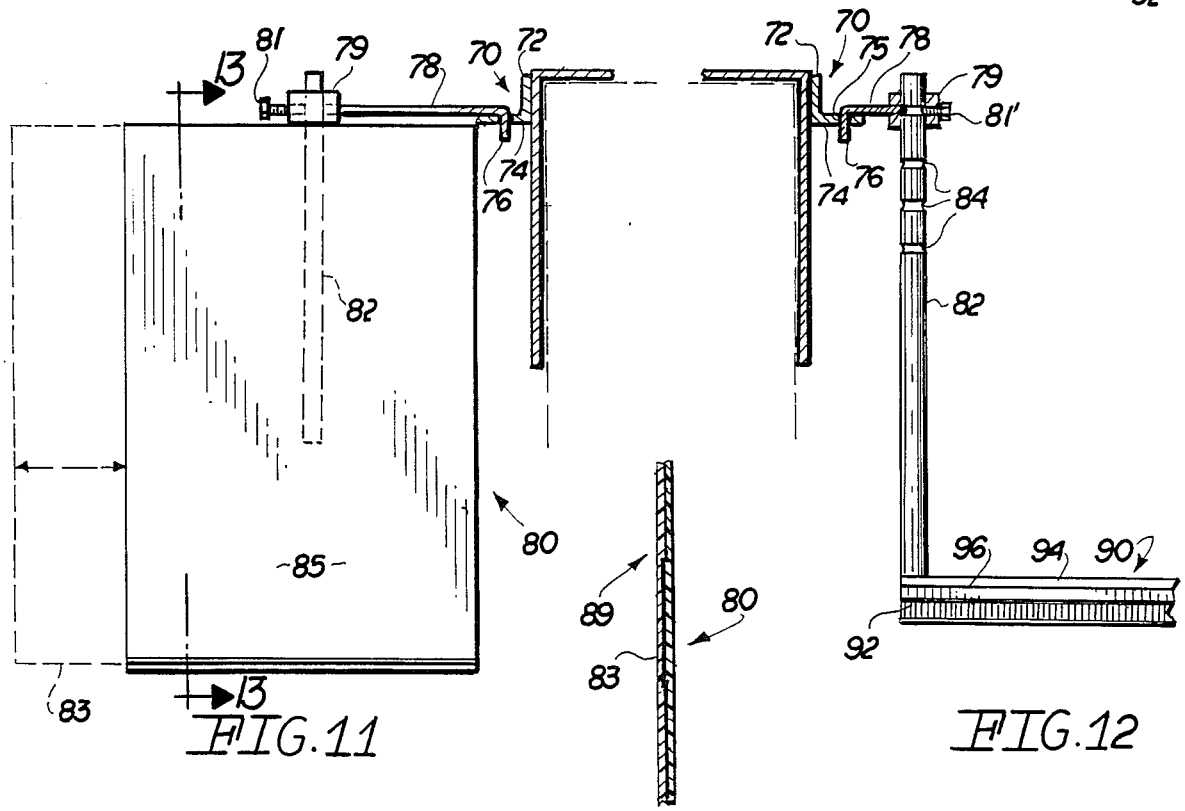

UNIVERSAL PERSONAL COMPUTER VISOR/ORGANIZER ASSEMBLY

BACKGROUND OF THE INVENTION

1. Field of the Invention

This invention relates to a visor or shading structure for use in combination with a viewing screen to prevent undesirable glare from appearing thereon or being reflected therefrom and further comprising adjustable components to accomplish effective fitting of the assembly to monitor housings of varying sizes.

2. Description of the Prior Art

The use of viewing screens in personal computers, word processors, etc. is extremely popular and widespread. Such monitors are used at terminals or work stations both in a business environment and at home. Regardless of the place of usage, one problem frequently associated with the use of the viewing screen is glare or reflection from overhead lighting or lighting from the surrounding work area.

This problem is recognized in the prior art and attempts to correct such problem is evidenced by the existence of U.S. Design Pat. No. 256,119 to Klemm. The design disclosed in the Klemm patent is directed to a hood for computer cathode-ray terminals and comprises a one piece plastic or like material configuration having one end configured for attachment to the screen housing or monitor itself and a substantially elongated configuration apparently designed to extend outwardly from an overhead positioning of the Klemm hood structure relative to the viewing screen of the terminal. While operable for its intended function, it would appear that the Klemm structure is such as to lack versatility in that one structure would not be readily adaptable for various sizes or configurations of the numerous commercially available monitor housings presently on the market.

Accordingly, even in light of the Klemm design, there is still a recognized need in the computer and related products industry for a visor structure which is capable of fitting any one of a plurality of commercially available monitors or screen housings and be further adjustable so as to selectively vary the position of the overhanging portion of such a preferred visor structure so that a maximum operative position can be assumed in order to prevent or significantly reduce the amount of glare or reflection striking the viewing screen. Also it becomes or serves as a base which adapts other options to minimize desk confusion, organize and optimize personal productivity. The frame which serves as the attachment portion to the monitor provides a sturdy base from which to mount other options [copy holder, mouse holder, template holder (used to define function keys for use with different programs) fiber pen holder, optional blinder flap (used for privacy when viewing PC from unwanted spectators)]and adds organization and expandability of a standard monitor creating a new dimension to the product.

SUMMARY OF THE INVENTION

The present invention relates to a visor assembly of the type designed for use in the protecting or shading of a viewing screen associated with the terminal of a personal computer (PC), word processor or like equipment and main frame terminals, from overhanging or surrounding illumination associated with the work area of such equipment. The problem recognized in the prior art is the associated glare or reflection of the surrounding illumination onto the viewing screen rendering the viewing screen substantially more difficult to view and rendering such viewing by an operator of the equipment, especially for long periods of time, significantly more tiring.

The visor assembly of the present invention comprises an elongated base portion secured by a mounting means to an upper periphery of the housing in which the viewing screen is located. The base is of sufficient transverse and longitudinal dimension to extend outwardly from the screen housing and in overlying or overhanging relation thereto. A forward extension in the form of an elongated plate is movably connected to the base and attached so as to be initially positioned and move relative thereto in co-planar relation. The forward extension is thereby selectively positionable in an outwardly projecting position substantially from a leading longitudinal edge of the base portion a sufficient distance to block or shield an effective amount of incoming illumination from actually striking the viewing screen thereby preventing glare or reflection thereon. The forward extension is movably connected to the base portion so as to move therewith relative to the mounting means. The mounting means in turn is pivotally connected to the base portion thereby allowing a selective angular positioning of the base portion as well as the forward extension relative to the upper periphery of the screen housing to which the mounting means is fixedly and possibly removably attached.

The assembly of the present invention further comprises a lateral extension means in the form of two extension plates movably secured to said base portion and extending outwardly from opposite longitudinal ends thereof in a direction coincident with the longitudinal axis of the base portion. The positioning of the extension plates in the manner set forth above, and more fully described hereinafter, allows for adjustment of the transverse dimension of the base portion and adaptability to monitors or screen housings of various dimensions and configurations. Similarly, the mounting member defining the mounting means has two extension members similarly mounted so as to slide longitudinally of the mounting member and extend outwardly a preselected distance relative to opposite ends of the mounting member.

The extension plates and the extension members associated with the mounting means are cooperatively interconnected to one another along distal ends of correspondingly positioned depending arms attached to both of the extension plates and to the extension member. The distal extremities or ends being interconnected serves to define a positioning means which will regulate the angular orientation of the base portion as well as the forward extension relative to an overhanging orientation of the viewing screen. The user of the subject assembly therefore may adequately position intended components of the subject assembly so as to overhang the viewing screen at a preferred angle and extend outwardly an optimum distance over the viewing screen in order to eliminate or reduce reflection or glare impinging on the viewing screen as desired. It should be readily apparent therefore, that the subject assembly has great versatility and being readily attachable to a monitor or screen housing of various dimensions and configurations. Further, the degree of outer extension of the forward extension member and its angular orientation in overhanging relation to the viewing screen may also be readily adjusted regardless of the size or configuration of the viewing screen or viewing screen housing thereby making the assembly of the present invention readily usable in combination with almost any monitor consisting as a part of a PC, word processor, or like equipment.

The invention accordingly comprises the features of construction, a combination of elements and an arrangement of parts which will exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the subject assembly mounted on a monitor housing in operative position.

FIG. 2 is a detailed perspective view of one component of the subject assembly.

FIG. 3 is a detailed view and perspective of another component of the present invention.

FIG. 10 is a perspective view in partial phantom of another embodiment of the present invention comprising options usable in combination with the subject visor assembly.

FIG. 11 is a front plane view along line 11—11 of FIG. 10 in partial phantom and section of one component of the present invention.

FIG. 12 is a front plane view in partial section along line 12—12 of FIG. 10 showing another component of the present invention.

FIG. 13 is a sectional view in partial cut-away along line 13—13 of FIG. 11 showing structural details of the embodiment of the component in FIG. 11. Like reference numerals refer to like parts throughout the several views of the drawings.

DETAILED DESCRIPTION OF THE PREFERRED EMBODIMENT

Figure 4:
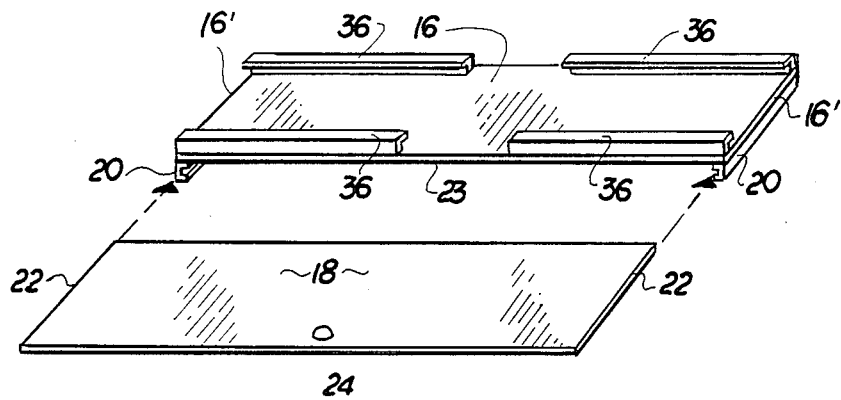
FIG. 4 is a perspective view in detail of cooperative components of the subject assembly.
Figure 5:
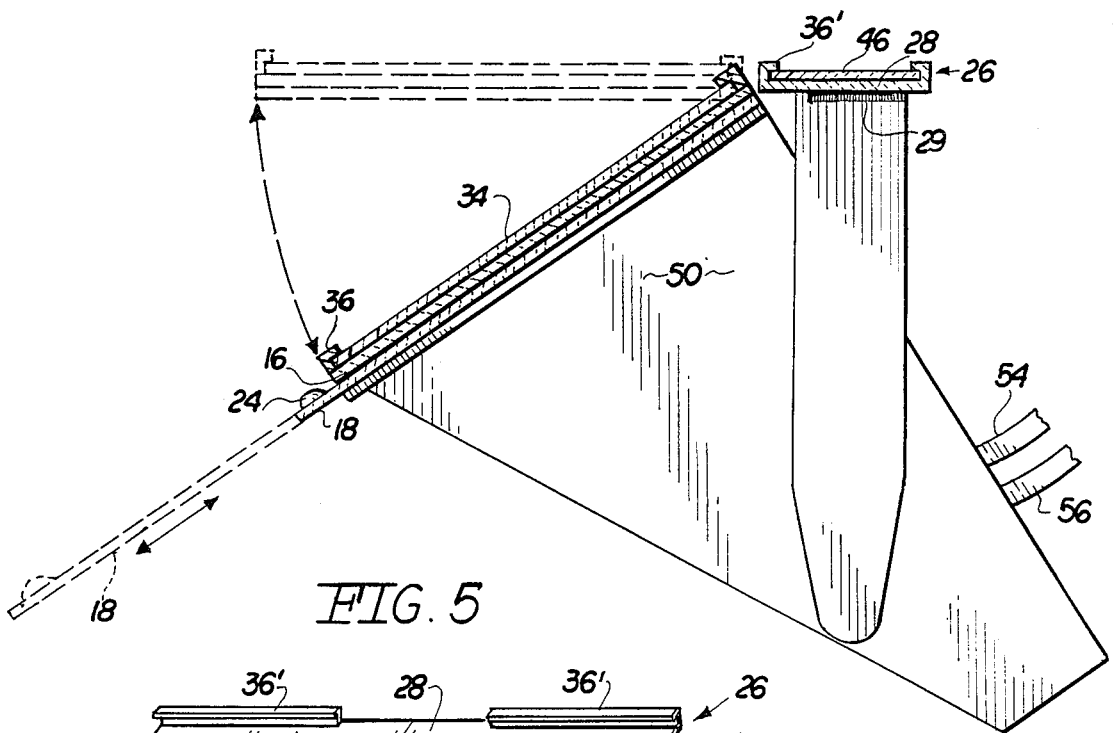
FIG. 5 is a sectional view in partial phantom of the various components of the subject assembly under cooperative position relative to one another.
Figure 6:
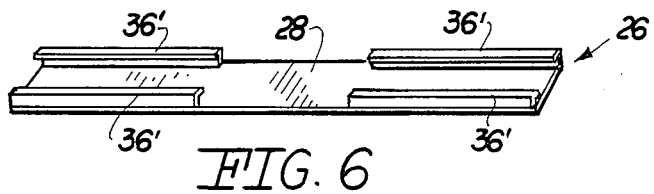
FIG. 6 is a perspective view of one component of the subject assembly.
Figure 7:
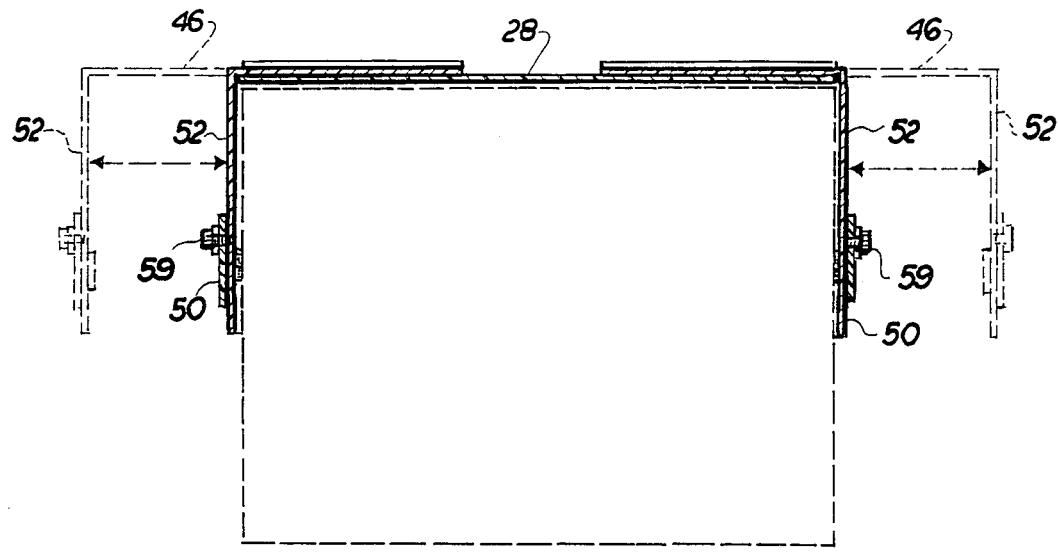
FIG. 7 is a sectional view along line 7—7 of FIG. 1.
Figure 8:
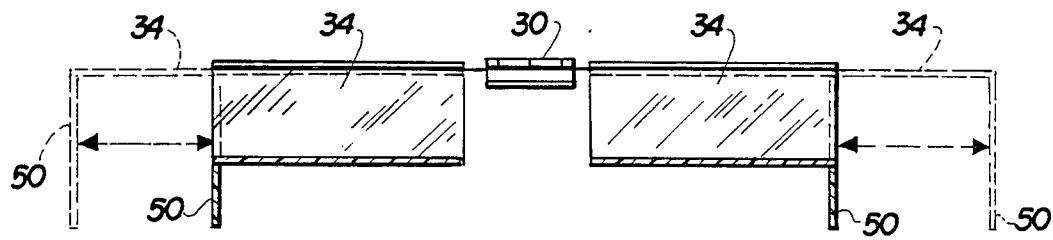
FIG. 8 is a sectional view along line 8—8 of FIG. 1.

The present invention is generally indicated as 10 and comprises a visor assembly for a monitor 12 which may be considered a screen housing for a viewing screen 14 of the type used in combination with a personal computer (PC), word processor, or like equipment in wide usage and commercially available under a number of brand names.

More specifically, the visor assembly of the present invention comprises a base portion 16 having an elongated configuration and connected or mounted on generally an upper peripheral portion of the monitor or screen housing 12 so as to overhang and be angularly oriented relative to the viewing screen 14 thereby preventing or reducing glare or reflection from impinging thereon. The base portion 16 has slidably connected thereto a forward extension 18 also having an elongated configuration as well as a transverse dimension sufficient to add to the outer extension or projection which overhangs the viewing screen 14. More specifically, a pair of transversely oriented runners 20 are connected as shown to the base portion 16 and are configured to slidably engage or embrace the correspondingly positioned edges as at 22 of the forward extension 18. The forward extension 18 is therefore allowed to slide in co-planar relation to the base portion 16 and, as preferred, outwardly from a forward longitudinal edge 23 of the base portion 16. By virtue of this arrangement, it should be readily apparent that the user of the subject assembly 10 can outwardly adjust the position of the forward extension 18 to any one of a plurality of outwardly projected positions thereby determining the best disposition of the forward extension 18 to reduce or eliminate the maximum amount of glare appearing on the screen 14. In order to facilitate positioning of the forward extension 18, a knob or handle member as at 24 may be mounted thereon as shown.

As is also apparent, the base portion 16 is pivotally and thereby movably connected to an upper periphery of the housing due to the provision of a mounting means generally indicated as 26. The mounting means includes a mounting member 28 having an elongated configuration and extending along the length f the periphery of the monitor or screen housing 12 as shown. A connector assembly may be in the form of a hook-and-loop type fastener. The hook-and-loop type fastener may have one strip or portion thereof fixedly secured, as by adhesive or the like, to the upper peripheral portion of the monitor 12 (not shown). An under or confronting surface of the mounting member 28 may include another component of the hook-and-loop type fastener 29 such that the two components may be removably secured to one another in a conventional fashion. This of course allows the mounting member 28 to be removably attached to the upper periphery of the monitor 12 thereby enabling the entire assembly to be removed and or stored when not in use. One or more hinge elements as at 30 may be connected to the mounting strip 28 as well as appropriate location on the base portion 16. The angular orientation of the base portion 16 as well as the forward extension 18 is thereby readily capable of being selected by the user of the assembly merely by pivotally adjusting or positioning the base 16 and the forward extension 18 relative to the mounting strip 28 due to the provision of the hinge structures 30. A positioning means is secured and or serves to interconnect the mounting means 26 and the base portion 16 in a manner which will be described in greater detail hereinafter.

In order to add greater versatility to the assembly of the present invention, a lateral extension means in the form of two extension plates 34 are provided and slidably connected to move longitudinally relative to the base portion 16 and in at least partially overlying relation to correspondingly positioned portions thereof. The extension plates 34 may be connected to the base 16 in slidable engagement therewith by means of a pair of runners 36 attached as shown which serve to embrace the longitudinal edges 38 of each correspondingly positioned extension plate 34 such that each of the extension plates 34 is extendable outwardly from and relative to opposite longitudinal ends 16' of the base portion 16.

Figure 9:
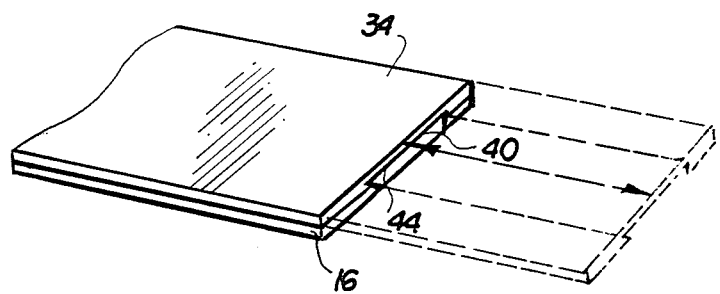
FIG. 9 is a perspective view in partial cut-away and phantom showing cooperative positions of various components of the present invention.

Another embodiment of the present invention as shown in FIG. 9 comprises an outer surface projection as at 40 extending outwardly from and exposed or outer surface of the base portion 16 and having a specific preferably dove tail configuration which eliminates the possibility of transverse removal of the respective extension plates 34 in a direction indicated by directional arrow 42. This is accomplished by the integral formation of a receiving channel 44 having a congruent and cooperatively corresponding cross-sectional configuration as that of the projection 40 and dimensioned to slidingly receive the projection 40 therein in a longitudinal direction. It should be apparent therefore, that each of the extension plates 34 may move longitudinally relative to the base portion 14 and projection 40 but may not be removed or moved transversely relative thereto. Naturally, in the embodiment shown in FIG. 9, the dove tail configuration of the outer projection 40 and the receiving channel 44 allows the longitudinal sliding movement of the respective extension plates 34 relative to opposite longitudinal ends of the base portion 16 such that their outer extension therefrom may be regulated to accommodate monitors and/or screen housings 12 of various dimensions and configurations depending upon the brand commercially available and utilized.

Similarly, the extension means 25 also includes extension members 46 slidable longitudinally relative to the mounting member 28 so as to be adjustably positionable and extendable outwardly from corresponding opposite longitudinal ends 28' of the mounting member 28 and along runners 36'. In another embodiment, interconnection between the extension members 46 and the mounting member 28 may be accomplished by similar outer projections 40' and receiving channels (not shown for purposes of clarity) formed on the under or confronting surfaces of the extension members 46 to accomplish the sliding engagement of the extension members 46 relative to the mounting member 28 in accordance with the directional arrows 49.

It will be further noted that each of the extension plates 34 and each of the extension members 46 have depending arm members 50 and 52 respectively secured to the outer ends thereof. The arms 50 depend downwardly from the outer ends of the extension plates 34 and thereby again reduce glare from illumination coming into or impinging on the screen 14 from this direction. In addition, the arms 50 further serve as mounts or supports at outer distal extremities thereof as at 50' for the positioning means. The positioning means as set forth above, include rearwardly extending fingers 54 having elongated slots or like members 56 therein. The arms also preferably have a curvilinear configuration as shown and extend a sufficient distance rearwardly from the distal extremities 50' so as to engage and be adjustably attached to the distal extremities 52' of the depending arms 52 extending from the outer ends of the extension members 46 as shown.

Connectors in the form of adjustable screw-type connectors as at 58 pass through appropriately positioned apertures 59 and also through the elongated slots 56 wherein they are secured thereto in any one of a plurality of positions along the length of the respective slots 56 such that the relative angular orientation or position of the base portion 16 by virtue of their interconnection to the extension plates 34 may be determined relative to its overhanging relation to the viewing screen 14. As set forth above, since the forward extension 22 moves with and is angular oriented relative to the viewing screen 14 along with the base portion 16, the point of interconnection of the distal ends or extremities 52' relative to the fingers 56 will determine the angular orientation of both the base portion 16 and the forward extension 18 as desired to obtain an optimum disposition and eliminate the maximum amount of glare.

As shown in FIGS. 10 through 13, the present invention comprises additional structure in the form of a mounting bracket generally indicated as 70 and securable to one or both of the depending arms 52 of the extension members 46 as clearly shown in FIG. 10. The mounting brackets 70 include a first portion 72 securable by screw type connectors or any other applicable fastening means to the exposed surface of the depending arms 52. In addition, each bracket 70 includes an outwardly extending arm 74 protruding transversely or perpendicularly to the aforementioned exposed surface of the depending arms 52 as clearly shown in FIGS. 10, 11 and 12. At least one but preferably a plurality of apertures may be formed in arm 72 of each bracket 70 as at 73 where the placement of the aforementioned screw type connectors. Similarly, in each of the outwardly extending arms 74, a plurality of holes, preferably three in number, may be integrally formed as at 75 through which a depending finger 76 passes for supporting interconnection of any one of a plurality of optional components such as sheet holder, generally indicated as 80, and a shelf-type structure generally indicated as 90. Each of the depending fingers 76 are structured to define a distal end of a support and mounting rod 78 formed of a rigid metal and/or plastic material of sufficient structural integrity to support in an outwardly extended substantially cantilevered fashion any one of the aforementioned options such as the sheet or copy holder 80 and the shelf-type structure 90.

A connecting sleeve 79 is cooperatively structured with a set screw or like 81 such that each of the support rods 78 may be fixed into any one of adjustable positions along the length of mounting shafts 82. The mounting shafts 82 preferably have a plurality of annular recesses as at 84 in which a set screw such as 81' may readily fit. Each of the support shafts 82 may be fixedly secured to an optional component which it supports such as the copy holder 80 and/or the shelf 90. The location and means of attachment of the support shafts 82 to their respective components may vary as shown in FIGS. 11 and 12.

Specific structural features of the components include a substantially hollow interior of the shelf-like structure 90 as at 92 for the storage of any materials associated with the use of the PC such as templates, key definitions, etc. or the like. Similarly, an exterior shelf surface as at 94 is provided for the placement of similar templates or key definitions currently in use, wherein a slight incline may be inherently structured into the exposed shelf 94 and a longitudinally applied upwardly extending flange 96 serves to prevent inadvertent falling or removal of any component from the exposed shelf or surface 94.

With regard to the copy holder 80, another feature may be incorporated therein such as an outwardly extending rear sheet 83 wherein the sheet 83 is extendable outwardly and/or slideable in underlying relation to the exposed sheet 85 as best shown in FIGS. 11 and 13. Sliding attachment of the undersheet 83 relative to the exposed sheet 85 may be accomplished by a dovetail and cooperatively configured slot arrangement generally indicated as 87 similar in operation and structure to the mechanism and embodiment shown in FIG. 9.

In another arrangement other than the specific cooperative positioning of the shelf-like structure 90 as pictured in FIG. 10 would be the mounting of the support shaft 82 and sleeve 79 on the opposite side where the copy or sheet holder 80 is now positioned. Once in that position the shelf-like structure 90 could be oriented at the bottom-most peripheral edge of the housing 12 of the monitor, and extending directly outwardly from the front surface thereof in substantially overhanging but non-interfering relation with the keyboard. In this position, both the interior portion 92 as well as the exposed surface 94 could possibly be more readily efficient and versatile.

Now that the invention has been described,
What is claimed is:

1. A visor assembly designed for overhanging attachment and at least partial shading of the viewing screen of a monitor, said assembly comprising:
   a. a base portion having an elongated configuration and a sufficient transverse dimension to extend outwardly from an upper periphery of a screen housing in substantially overlying relation to the viewing screen,
   b. a mounting means for securing said base portion to the screen housing, said mounting means fixedly secured to the screen housing and pivotally connected to the base portion, said base portion selectively positionable into any one of a plurality of angular orientations relative to the screen housing and in overlying relation to the viewing screen,
   c. a forward extension movably mounted on said base portion in parallel relation thereto and movable therewith relative to said mounting means and the screen housing,
   d. said forward extension positionable outwardly from a leading longitudinal edge of said base portion in an extended overhanging relation to the viewing screen,
   e. lateral extension means for enlarging the longitudinal dimension of said base portion and movably mountable in coplanar relation to said base portion and movable therewith relative to the screen housing and positionable longitudinally outward from opposite longitudinal ends thereof, and
   f. positioning means interconnected at least in part to said base portion and structured for securing said base portion and said forward extension in any one of said angular orientations relative to the viewing screen and the screen housing.

2. An assembly as in claim 1 wherein said mounting means comprises an elongated mounting member secured to the screen housing and hinge means interconnecting corresponding longitudinal edges of said base portion and said mounting member for pivotal movement of said base portion relative to the mounting member.

3. An assembly as in claim 2 wherein said mounting means includes a connector assembly mounted on both said screen housing and the mounting member and structured to removably secure the mounting member to the screen housing.

4. An assembly as in claim 3 wherein said connector assembly comprises hook-and-loop type fastener structure disposed in removable interconnecting relation to one another.

5. An assembly as in claim 1 wherein said lateral extension means comprises two extension plates each slidable longitudinally of said base portion relative to a different opposite longitudinal end thereof.

6. An assembly as in claim 5 wherein each of said extension plates includes a downwardly depending arm fixedly secured to an outer end thereof and movable therewith relative to said base portion.

7. An assembly as in claim 6 wherein said lateral extension means further comprises two member extensions slidable longitudinally and in parallel relation to a different, opposite end of said mounting member.

8. An assembly as in claim 7 wherein each of said extension members includes a downwardly depending arm fixedly secured to an outer end thereof and movable therewith relative to said mounting member.

9. An assembly as in claim 8 wherein said positioning means comprises an adjustable interconnection between distal extremities of correspondingly positioned depending arms of said mounting strip and said extension plate.

10. An assembly as in claim 9 wherein said positioning means comprises an elongated finger fixedly secured to said distal extremity of each depending arm of said extension plates, said fingers extending rearwardly towards said distal extremity of correspondingly positioned arms each said mounting member and in communicating relation therewith.

11. An assembly as in claim 10 wherein each of said fingers comprises a curvilinear configuration and said distal extremities of said arms of said mounting members are connectable thereto along the length thereof.

12. An assembly as in claim 1 wherein said lateral extension means comprises two extension plates, each slidable longitudinally of said base portion relative to a different opposite longitudinal end thereof; and further including spaced apart parallel runners mounted on an exposed surface of said base portion and disposed and structured to slidingly embrace opposite longitudinal edges of each of said extension plates.

13. An assembly as in claim 1 wherein said lateral extension means comprises two extension plates, each slidable longitudinally of said base portion relative to different opposite longitudinal ends thereof; and further including an elongated outward projection secured to an exposed surface of said base portion and disposed in underlying relation to each extension plate and an elongated channel integrally formed in a confronting surface of each extension plate and disposed and configured to slidingly receive said projection therein.

14. An assembly as in claim 13 wherein said outward projection and said elongated channel each have congruent, cooperative transverse configurations shaped to prevent removal of said extension plate from said base portion in a transverse direction.

15. An assembly as in claim 14 wherein said congruent, cooperative configurations of said elongated channel and said outward projection comprise a dove-tail configuration.

16. An assembly as in claim 1 further comprising an option support assembly including at least one bracket fixedly attached to said lateral extension means and comprising an outwardly extending arm structured to receive a support rod therein, said support rod adjustably connectable to a mounting shaft, said mounting shaft fixedly attached to an optional component.

* * * * *